US012659389B2

(12) United States Patent
Hsu et al.

(10) Patent No.: US 12,659,389 B2
(45) Date of Patent: Jun. 16, 2026

(54) HINGE STRUCTURE AND ELECTRONIC DEVICE

(71) Applicant: Chiun Mai Communication Systems, Inc., New Taipei (TW)

(72) Inventors: Wei-Hua Hsu, New Taipei (TW); Chia-Hsin Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 344 days.

(21) Appl. No.: 18/240,111

(22) Filed: Aug. 30, 2023

(65) Prior Publication Data

US 2024/0089356 A1 Mar. 14, 2024

(30) Foreign Application Priority Data

Sep. 9, 2022 (CN) .......................... 202211105293.0

(51) Int. Cl.
*G06F 1/16* (2006.01)
*H04M 1/02* (2006.01)
(52) U.S. Cl.
CPC ........ *H04M 1/0216* (2013.01); *G06F 1/1616* (2013.01); *G06F 1/1652* (2013.01); *G06F 1/1656* (2013.01); *G06F 1/1681* (2013.01); *H04M 1/0268* (2013.01)
(58) Field of Classification Search
CPC .... G06F 1/1616; G06F 1/1652; G06F 1/1681; H04M 1/0216; H04M 1/022; H04M 1/0225

See application file for complete search history.

(56) References Cited

U.S. PATENT DOCUMENTS

| | | | |
|---|---|---|---|
| 2024/0004430 A1 * | 1/2024 | Zhao ........................ | F16C 11/04 |
| 2024/0121905 A1 * | 4/2024 | Cao .......................... | G09F 9/301 |
| 2024/0288902 A1 * | 8/2024 | You .......................... | F16C 11/04 |
| 2025/0243899 A1 * | 7/2025 | Zheng ..................... | G09F 9/301 |
| 2025/0258522 A1 * | 8/2025 | Zhang ................... | G06F 1/1652 |
| 2025/0306645 A1 * | 10/2025 | Liu ......................... | G06F 1/1616 |

FOREIGN PATENT DOCUMENTS

| | | |
|---|---|---|
| CN | 112049861 A | 12/2020 |
| CN | 216691841 U | 6/2022 |

\* cited by examiner

*Primary Examiner* — Anthony Q Edwards
(74) *Attorney, Agent, or Firm* — ScienBiziP, P.C.

(57) ABSTRACT

A hinge structure is configured to be disposed between a first body and a second body. The hinge structure includes a first shaft assembly, at least two guiding members, a second shaft assembly, and two supporting plates. Each guiding member includes a first end and a second end, the first end is bent to form a sliding groove. The second shaft assembly is disposed in the sliding groove. The two supporting plates are connected to the first body and the second body, respectively, one end of each supporting plate is sleeved on the first shaft assembly, and another end of each supporting plate is fixed to the second end of; when the first body and the second body are closed to or opened with each other, the second shaft assembly is displaced relative to the guiding member. An electronic device is provided according to the present disclosure.

11 Claims, 13 Drawing Sheets

200

HINGE STRUCTURE AND ELECTRONIC DEVICE

CROSS-REFERENCE TO RELATED APPLICATIONS

This present disclosure is based on and claims priority to China Patent Application No. 202211105293.0 filed on Sep. 9, 2022 in China National Intellectual Property Administration, the contents of which are incorporated by reference herein.

FIELD

The subject matter herein generally relates to mechanical technologies, in particular to a hinge structure and an electronic device having the hinge structure.

BACKGROUND

An electronic device may have a flexible screen. The flexible screen has a foldable area, and a supporting structure may be arranged on the folding area to support the flexible screen. However, various components may be needed to realize the supporting function, which may result in an increase of a size and a weight of the electronic device, causing the cost of the electronic device to be increased and the structure of the assembly process to be complicated. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
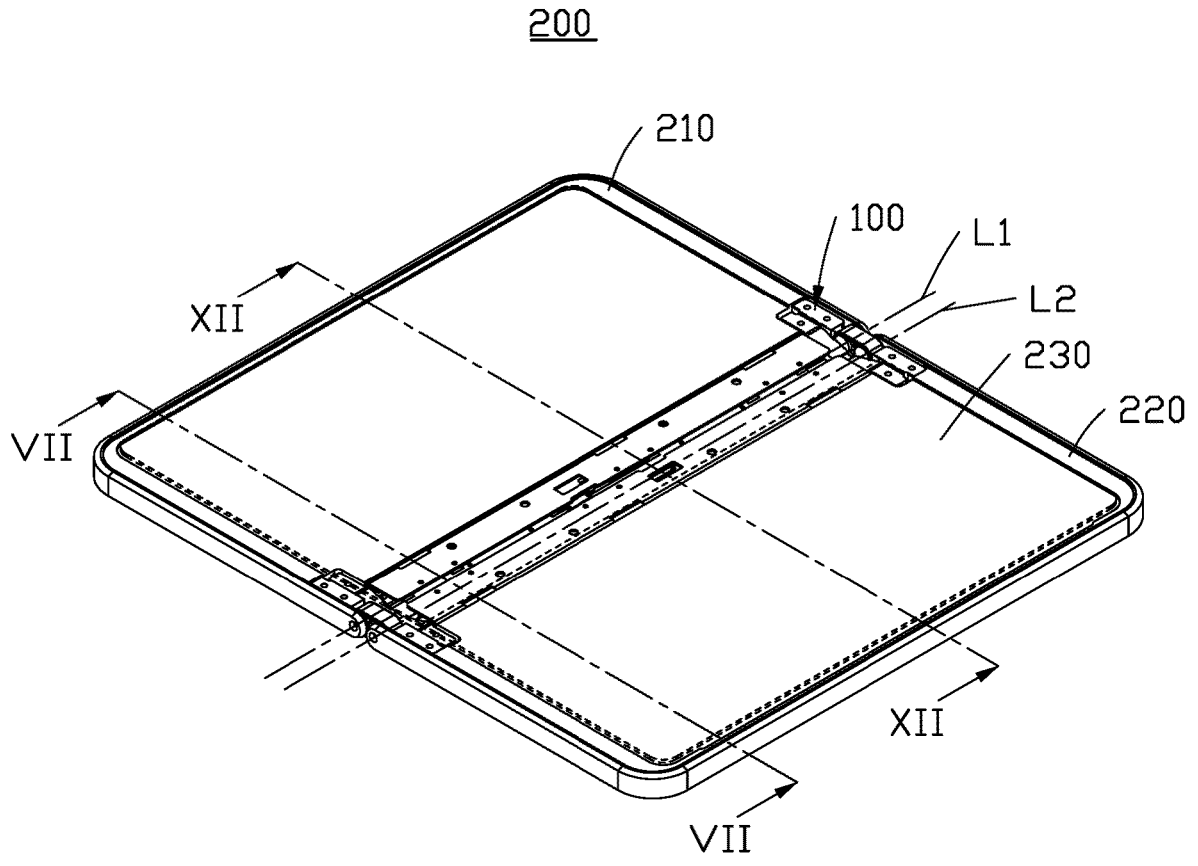
FIG. 1 is a diagrammatic view of an embodiment of an electronic device in an open state according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Figure 2:
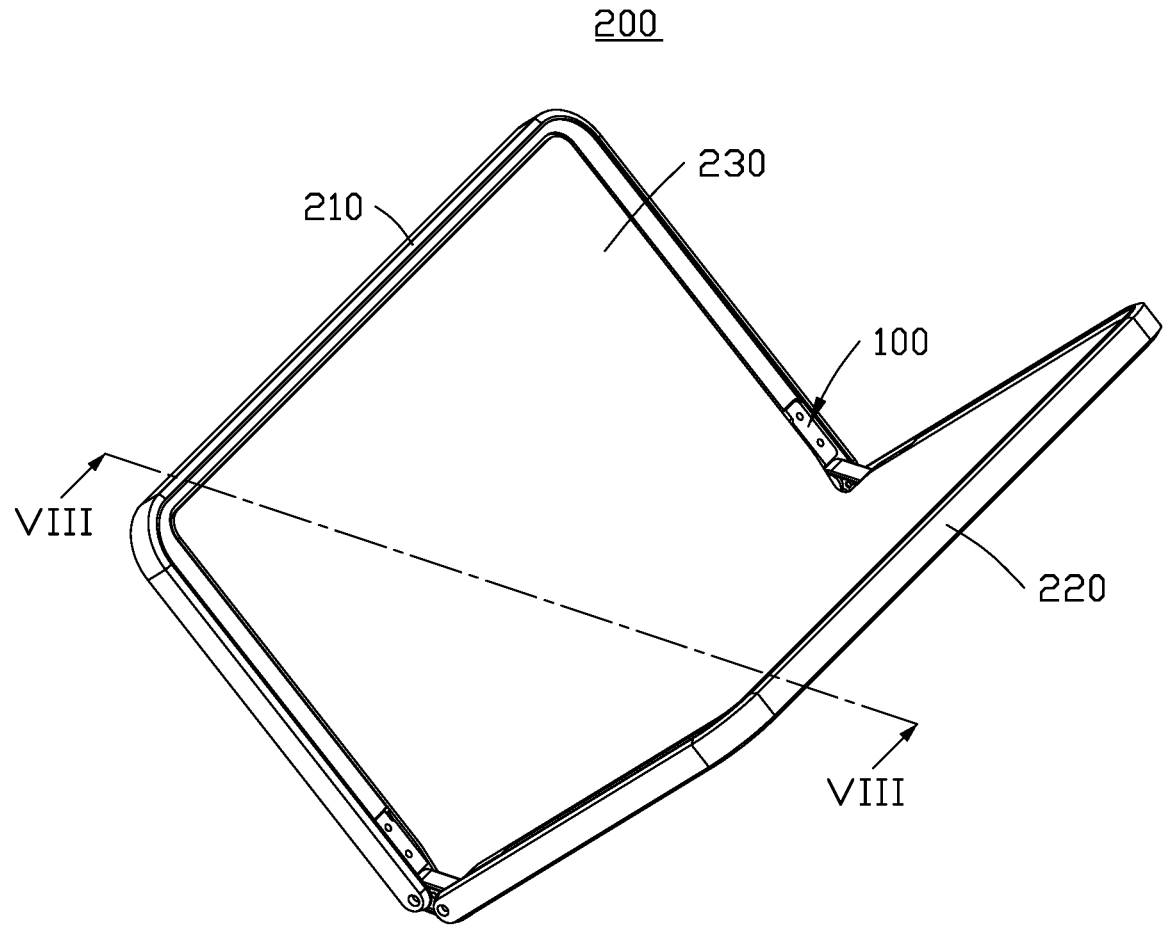
FIG. 2 is similar to FIG. 1, but shows the electronic device in a half-open state.
Figure 3:
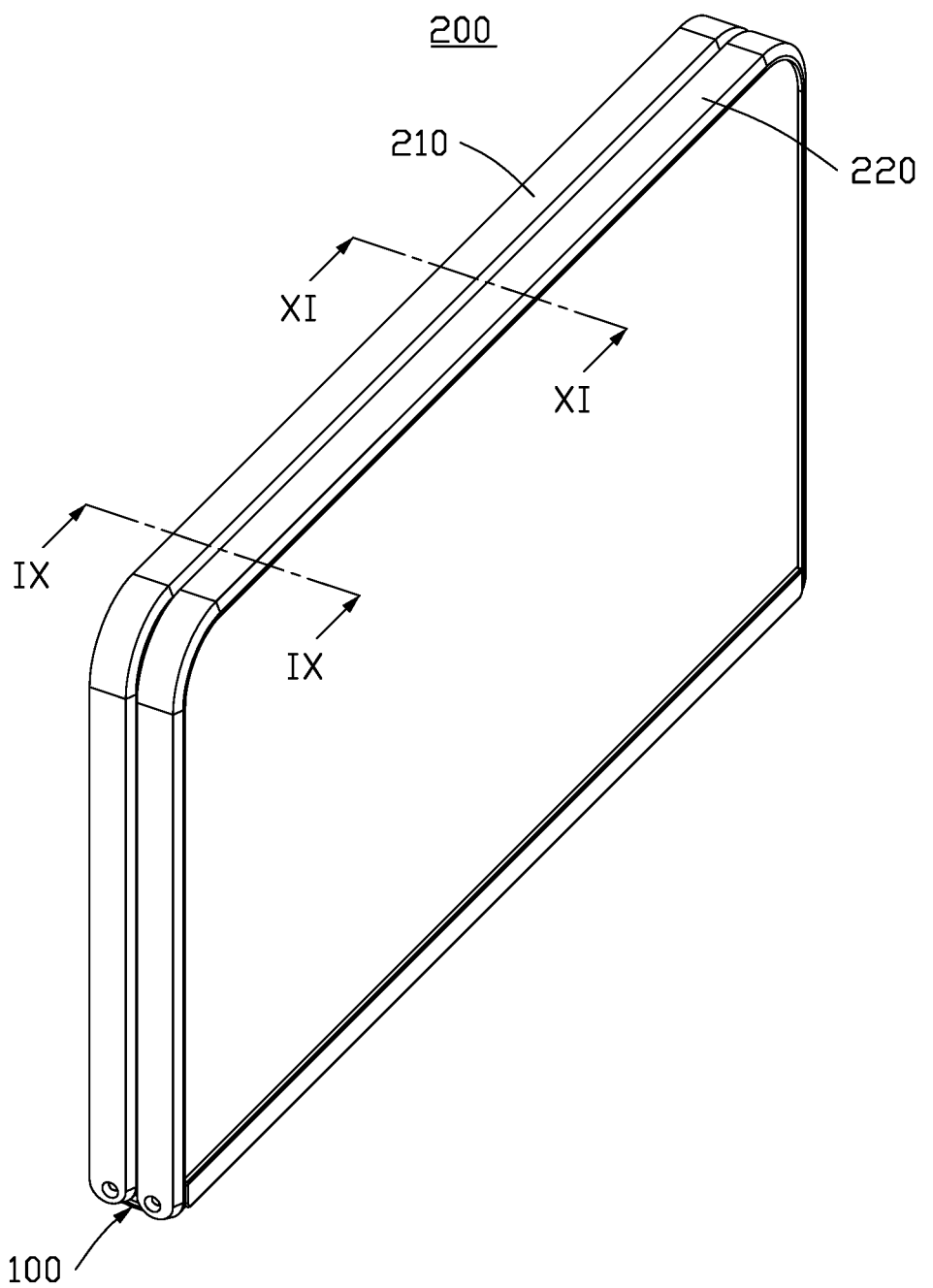
FIG. 3 is similar to FIG. 2, but shows the electronic device in a closed state.

Referring to FIGS. 1, 2, and 3, an electronic device 200 is provided according to an embodiment of the present disclosure, and the electronic device 200 may be a foldable mobile phone in some embodiments. FIG. 1 is diagrammatic view of an embodiment of the foldable mobile phone in an open state. FIG. 2 is similar to FIG. 1, but shows the foldable mobile phone in a half-open state. FIG. 3 is similar to FIG. 2, but shows the foldable mobile phone in a closed state.

In other embodiments, the electronic device 200 may be a foldable tablet, a foldable computer, a foldable notebook, a vehicle-mounted mobile device, and any other electronic device equipped with a flexible foldable display screen.

The electronic device 200 includes a hinge structure 100, a first body 210, and a second body 220. The hinge structure 100 connects the first body 210 and the second body 220, so that the first body 210 and the second body 220 can rotate with respect to each other through the hinge structure 100, thereby switching between the open state and the closed state and forming a desired angle between the first body 210 and the second body 220.

In some embodiments, the electronic device 200 further includes a flexible screen 230. The flexible screen 230 is disposed on the same side of the first body 210, the hinge structure 100, and the second body 220. The flexible screen 230 covers the first body 210, the hinge structure 100, and the second body 220. The first body 210 can rotate about a first rotation axis L1, and the second body 220 can rotate about a second rotation axis L2. The first rotation axis L1 and the second rotation axis L2 parallel to each other.

Figure 4:
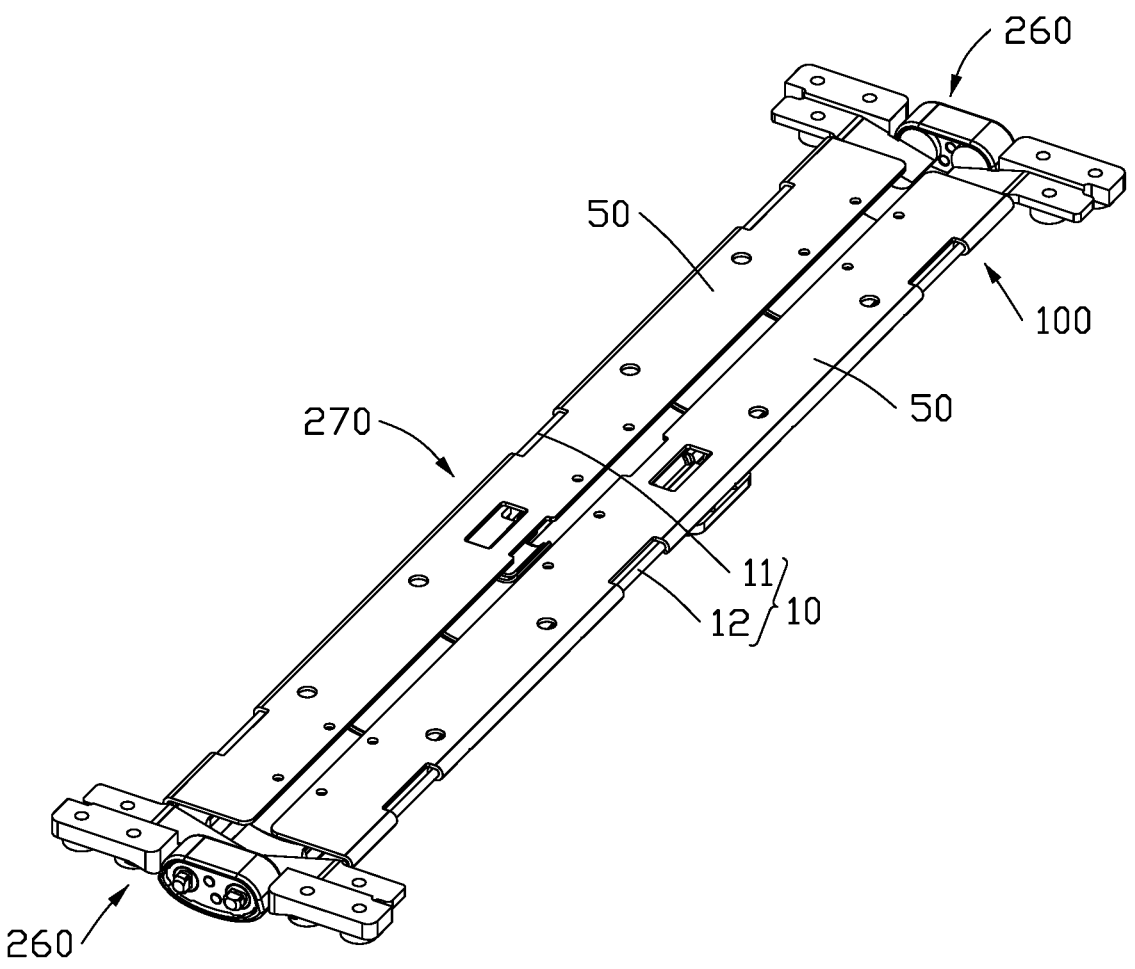
FIG. 4 is a diagrammatic view of a portion of the electronic device of FIG. 1.
Figure 5:
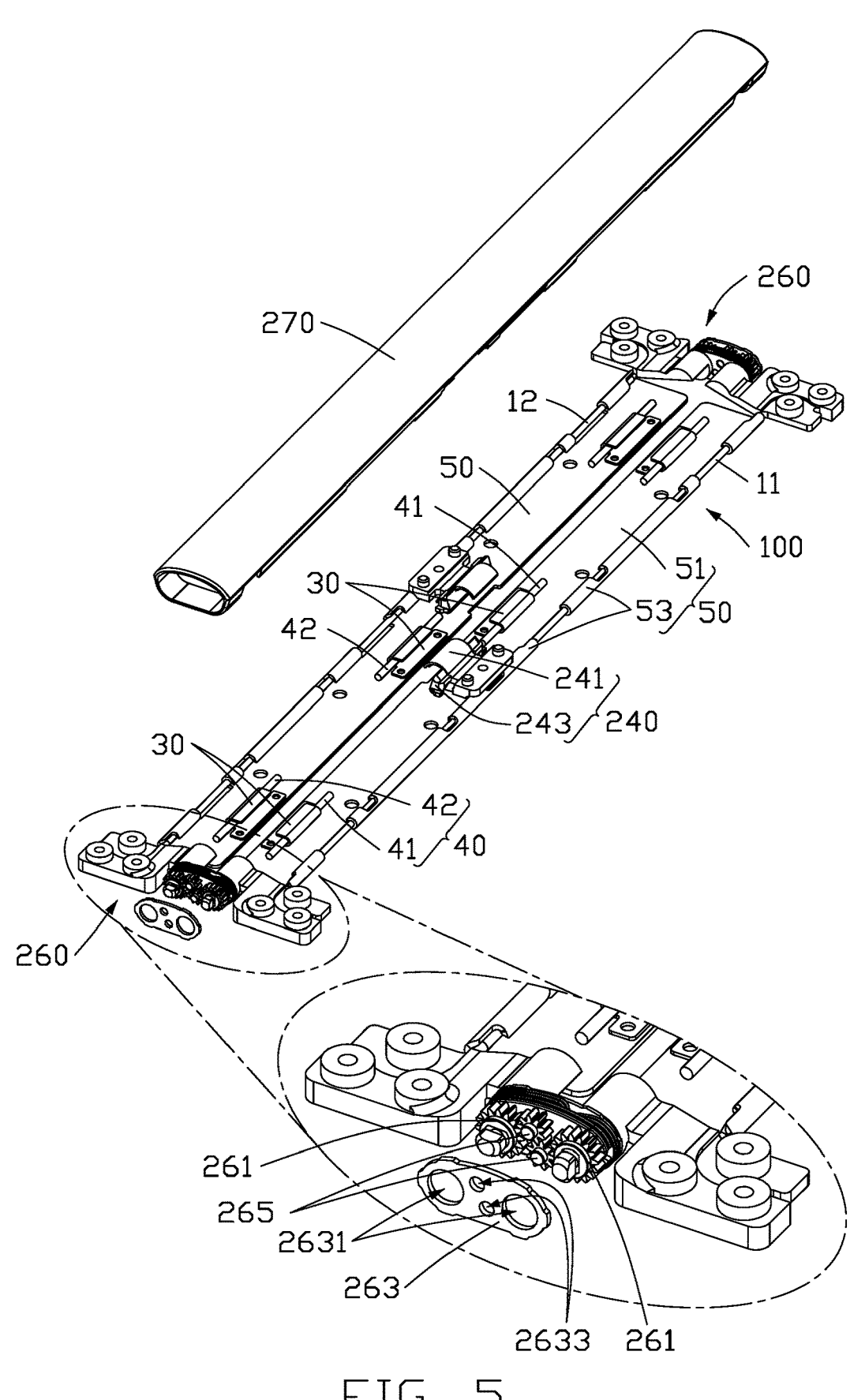
FIG. 5 is an exploded view of a portion of the hinge structure of FIG. 4.
Figure 6:
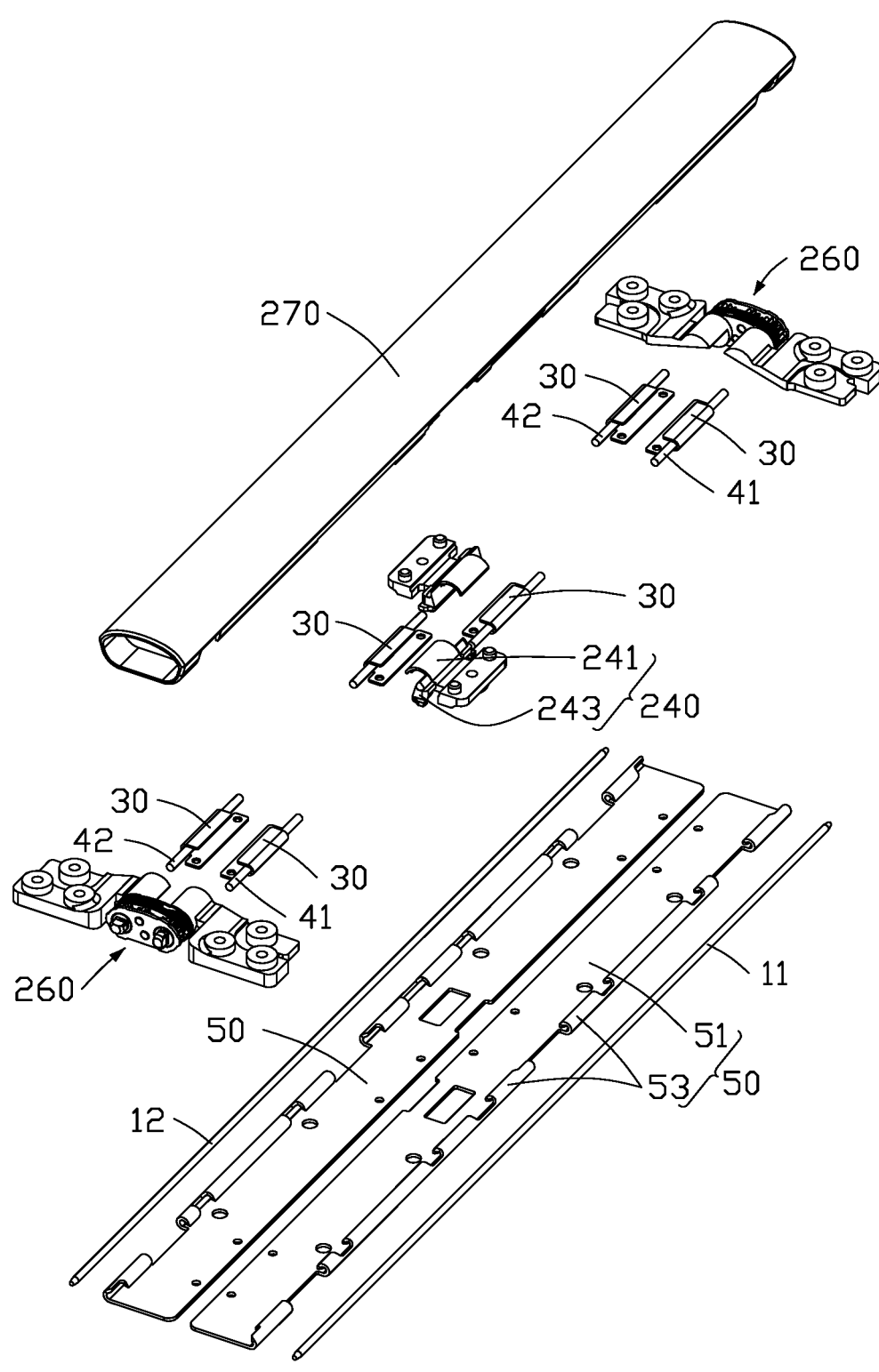
FIG. 6 is similar to FIG. 4, but showing the hinge structure from another angle.

Referring to FIGS. 4, 5, and 6, the hinge structure 100 includes a first shaft assembly 10, at least two guiding members 30, a second shaft assembly 40, and two supporting plates 50. In some embodiments, the guiding member 30 may be a shrapnel, and the shrapnel may be made of metal.

The first shaft assembly 10 is disposed in the first body 210 and the second body 220. The first shaft assembly 10 is connected to the first body 210 and the second body 220. The first shaft assembly 10 includes a first supporting shaft 11 and a second supporting shaft 12 parallel to each other. The first supporting shaft 11 is fixed to the first body 210, and the second supporting shaft 12 is fixed to the second body 220. The first supporting shaft 11, the second supporting shaft 12, the first rotation axis L1, and the second rotation axis L2 parallel to each other.

Referring to FIG. 5, the electronic device 200 further includes two hinge modules 260, and the two hinge modules 260 are disposed at both ends of the two supporting plates 50. Each hinge module 260 includes two shaft gears 261, two connecting gears 265, and at least one connecting piece 263. The connecting piece 263 connects the two shaft gears 261 together, and the two shaft gears 261 can be directly engaged with each other or indirectly connected with each other through the two connecting gears 265 disposed between the two shaft gears 261. The first rotation axis L1 and the second rotation axis L2 are rotation centerlines of the two shaft gears 261 respectively. The first body 210 and the second body 220 are fixed to one of the two shaft gears 261, and the first body 210, the first supporting shaft 11, and one of the two shaft gears 261 can rotate about the first rotation axis L1. The second body 220, the second supporting shaft 12, and another shaft gear 261 can rotate about the second rotation axis L2. The above rotation manner is only one implementation for realizing the rotations of the first body 210 around the first rotation axis L1 and of the second body 220 around the second rotation axis L2.

In the embodiment, two first through holes 2631 and two second through holes 2633 are defined on each connecting piece 263. Both the diameters of the two second through holes 2633 are smaller than the diameters of the two first through holes 2631, and the two second through holes 2633 are defined between the two first through holes 2631. The two shaft gears 261 pass through the two first through holes 2631 respectively, and the two connecting gears 265 pass through the two second through holes 2633 respectively, so that the two shaft gears 261 are engaged with the two connecting gears 265. A line connecting the two first through holes 2631 intersects with a line connecting the two second through holes 2633, which can reduce the size of the hinge module 260.

Figure 7:
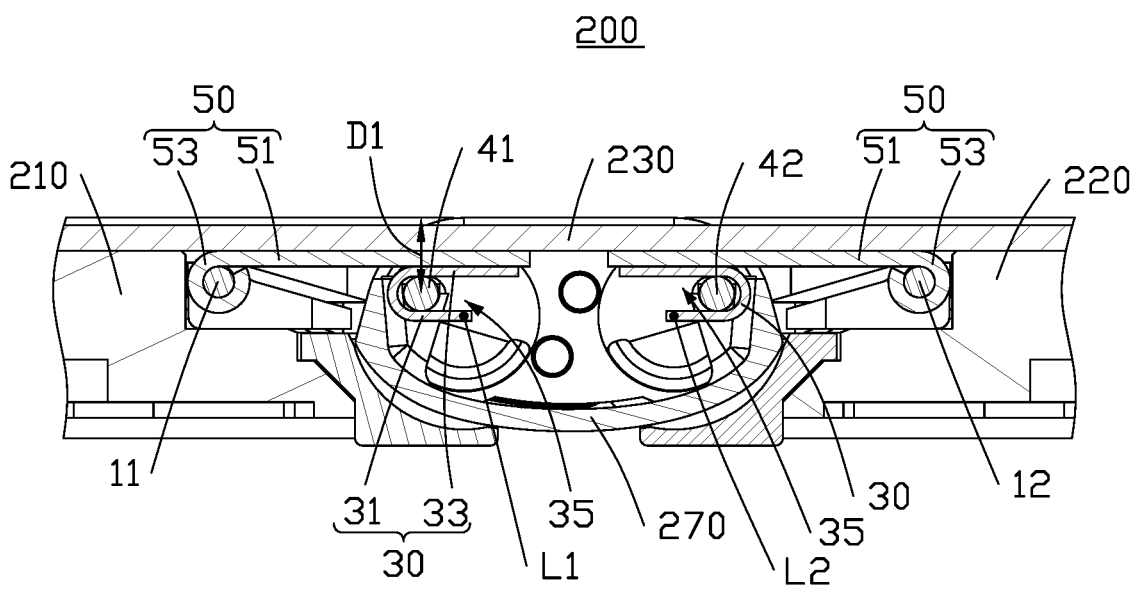
FIG. 7 is a cross-sectional view taken along line VII-VII of FIG. 1.

The two supporting plates 50 are spaced from each other, and the two supporting plates 50 are respectively connected to the first body 210 and the second body 220. The two supporting plates 50 are disposed in the folded area of the electronic device 200. When the electronic device 200 is in the open state, the two supporting plates 50 can support the flexible screen 230. One of the two supporting plates 50 is sleeved on the first supporting shaft 11, and another one of the two supporting plates 50 is sleeved on the second supporting shaft 12. Referring to FIG. 7, each supporting plate 50 includes a flat portion 51 and a winding portion 53 connected to each other. When the electronic device 200 is in the open state, the winding portion 53 is located on a side of the flat portion 51 away from the another supporting plate 50. In the embodiment, a distance between the two winding portions 53 is 22 mm, which is smaller than the minimum distance of 30 mm in the related art. The first supporting shaft 11 passes through the winding portion 53 of one of the supporting plates 50, the second supporting shaft 12 passes through the winding portion 53 of the another supporting plate 50, each winding portion 53 can rotate relative to the first supporting shaft 11 or the second supporting shaft 12.

Each supporting plate 50 may be provided with a plurality of winding portions 53. The plurality of winding portions 53 are spaced from each other, and a certain space is formed between two adjacent winding portions 53, so that a portion of the first body 210 is sleeved on the first supporting shaft 11 or a portion of the second body 220 is sleeved on the second supporting shaft 12. Thus, the first body 210, the first supporting shaft 11, and the corresponding supporting plate 50 are connected together, and the second body 220, the second supporting shaft 12, and the corresponding supporting plate 50 are connected together. The two supporting plates 50 are rotatably fixed on the first body 210 and the second body 220 respectively.

At least one guiding member 30 can be disposed on one supporting plate 50. Each guiding member 30 includes a first end 31 and a second end 33. The first end 31 is bent away from the supporting plate 50 to form a sliding groove 35. The second end 33 is fixed on the flat portion 51. Openings of the sliding grooves 35 on the two supporting plates 50 faces each other.

The second shaft assembly 40 includes a first guiding shaft 41 and a second guiding shaft 42 parallel to each other. The first guiding shaft 41, the second guiding shaft 42, the first rotation axis L1, and the first guiding shaft 41 does not coincide with the first rotation axis L1, and the second guiding shaft 42 does not coincide with the second rotation axis L2. The first guiding shaft 41 passes through the sliding groove 35 of the guiding member 30 fixed on a surface of one supporting plate 50. The second guiding shaft 42 passes through the sliding groove 35 of the guiding member 30 fixed on a surface of another supporting plate 50. The first guiding shaft 41 is disposed on a side of the sliding groove 35 close to the first supporting shaft 11, and the second guiding shaft 42 is disposed on a side of the sliding groove 35 close to the second supporting shaft 12. In the embodiment, each supporting plate 50 is fixed with a plurality of guiding members 30. Each of the first guiding shaft 41 and the second guiding shaft 42 can include in multiple sections for matching the length of the plurality of guiding members 30, which can reduce the space occupied by the first guiding shaft 41 and the second guiding shaft 42, so that more space for installing other electronic components in the electronic device 200 can be provided. When a plurality of guiding members 30 are fixed on each supporting plate 50, the plurality of guiding members 30 are coaxial with each other.

Referring to FIG. 5, the electronic device 200 may further include a barrel 270. The barrel 270 is fixed relative to the first rotation axis L1 and the second rotation axis L2. That is, during the relative rotations of the two shaft gears 261 which drive the first body 210 and the second body 220 to rotate relative to each other, the barrel 270 remains in a static state. The barrel 270 can be fixed to the connecting piece 263. Both the first guiding shaft 41 and the second guiding shaft 42 are fixed to the barrel 270. Both the first body 210 and the second body 220 are rotatably connected to the barrel 270. The first supporting shaft 11 fixed relatively to the first body 210 and one of the supporting plates 50 are rotatably connected to the first guiding shaft 41 fixed on the barrel 270. The second supporting shaft 12 fixed relative to the second body 220 and the another supporting plate 50 are rotatably connected to the second guiding shaft 42 fixed on the barrel 270. The first guiding shaft 41 does not coincide with the first rotation axis L1, and the second guiding shaft 42 does not coincide with the second rotation axis L2, so that a relative displacement is generated between the guiding member 30 and the first guiding shaft 41 or the second guiding shaft 42 accommodated in the guiding member 30. That is, the first guiding shaft 41 and the second guiding shaft 42 slides in the corresponding guiding member 30. When the first body 210 and the second body 220 switches from the open state to the closed state or from the closed state to the open state, at least two guiding members 30 rotates about the first shaft assembly 10 as a rotation axis, and the second shaft assembly 40 is displaced relative to the guiding member 30.

In order to more clearly illustrate that the relationship between the various components of the hinge structure 100 in the electronic device 200, the switching process from the open state to the closed state is described in detail below. In such switching process, the included angle between the first body 210 and the second body 220 changes from 180 degrees to 0 degree.

Referring to FIGS. 1 and 7, when the electronic device 200 is in the open state, the flexible screen 230 is on a same plane, and the two supporting plates 50 support the flexible screen 230 in the folded area of the electronic device 200. The first guiding shaft 41 is disposed between the first supporting shaft 11 and the first rotation axis L1, and the second guiding shaft 42 is disposed between the second supporting shaft 12 and the second rotation axis L2. A distance between the first guiding shaft 41 and the flexible screen 230 is defined as D1, and similarly, a distance between the second guiding shaft 42 and the flexible screen 230 is also defined as D1.

Figure 8:
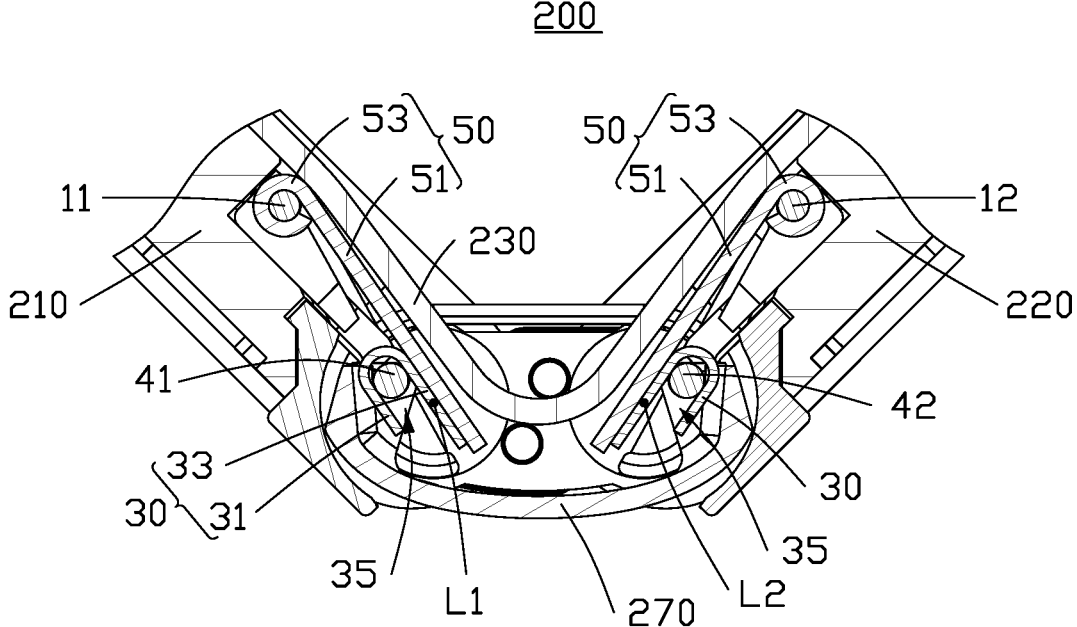
FIG. 8 is a cross-sectional view taken along line VIII-VIII of FIG. 2.

Referring to FIGS. 2 and 8, when an external force is applied to the first body 210 or the second body 220, the first body 210 and the second body 220 are folded toward the side where the flexible screen 230 is disposed. The first body 210 rotates about the first rotation axis L1, and the second body 220 rotates about the second rotation axis L2. The first supporting shaft 11 fixed to the first body 210 rotates about the first rotation axis L1, and the second supporting shaft 12 fixed to the second body 220 rotates about the second rotation axis L2. The winding portions 53 sleeved on the first supporting shaft 11 drives the flat portion 51 and the guiding member 30 to rotate about the first rotation axis L1. The winding portions 53 sleeved on the second supporting shaft 12 drives the flat portion 51 and the guiding member 30 to rotate about the second rotation axis L2. Due to the confine of the first guiding shaft 41 or the second guiding shaft 42 on the guiding member 30, the first guiding shaft 41 and the second guiding shaft 42 are fixed relative to the first rotation axis L1 and the second rotation axis L2. Therefore, the guiding member 30 slides relative to the first guiding shaft 41 and the second guiding shaft 42, the first supporting shaft 11 relatively slides toward a direction away from the first guiding shaft 41, and the second supporting shaft 12 relatively slides toward a direction away from the second guiding shaft 42. That is, one of the two flat portions 51 slides under the interaction between the first guiding shaft 41 the corresponding sliding groove 35, and one of the two flat portions 51 slides under the interaction between the second guiding shaft 42 and the corresponding sliding groove 35. That is, the two supporting plates 50 retracted toward the directions away from the first guiding shaft 41 and the second guiding shaft 42 respectively.

Figure 9:
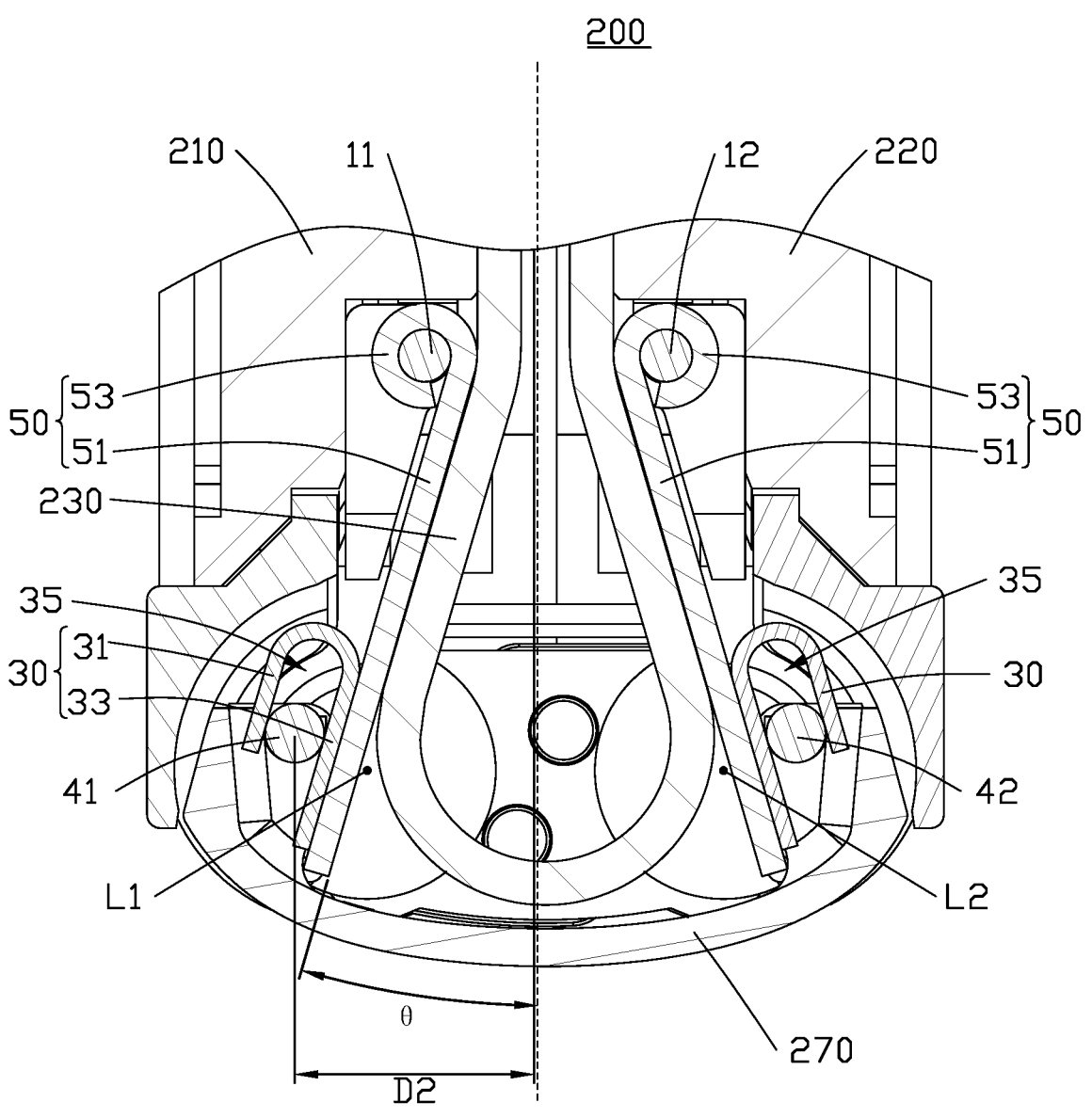
FIG. 9 is a cross-sectional view taken along line IX-IX of FIG. 3.

Referring to FIGS. 3 and 9, when the external force is applied to the first body 210 or the second body 220 again until the flexible screen 230 located on both sides of the electronic device 200 parallel to each other. That is, in the closed state, other areas of the flexible screen 230 away from the foldable area (i.e., the non-foldable areas) parallel to each other. During the process, the two supporting plates 50 are further retracted relative to the first guiding shaft 41 and the second guiding shaft 42, respectively, and the distance from the first guiding shaft 41 to the middle plane of the non-foldable areas is defined as D2. At the time, the distance between the two flat portions 51 of the two supporting plates 50 is greater than the distance between the winding portions 53 of the two supporting plates 50.

From the open state to the closed state of the electronic device 200, the distance D2 is greater than the distance D1, the distance between the first supporting shaft 11 and the first guiding shaft 41 increases, and the distance between the second supporting shaft 12 and the second guiding shaft 42 increases. An included angle between the two flat portions 51 and the surface of the flexible screen 230 parallel to each other is defined as θ. Therefore, the bending area of the electronic device 200 creates an escape space for accommodating the bent flexible screen 230, that is, a "water drop angle" is formed.

Each of the first body 210 and the second body 220 is rotated by 90 degrees, each supporting plate 50 is rotated by 90 degrees plus θ, and a small rotation angle of θ is produced between each supporting plate 50 and the first supporting shaft 11 or between each supporting plate 50 and the second supporting shaft 12, a space formed between the two flat portions 51 away from the winding portions 53 accommodates the flexible screen 230 in the bending area.

Figure 10:
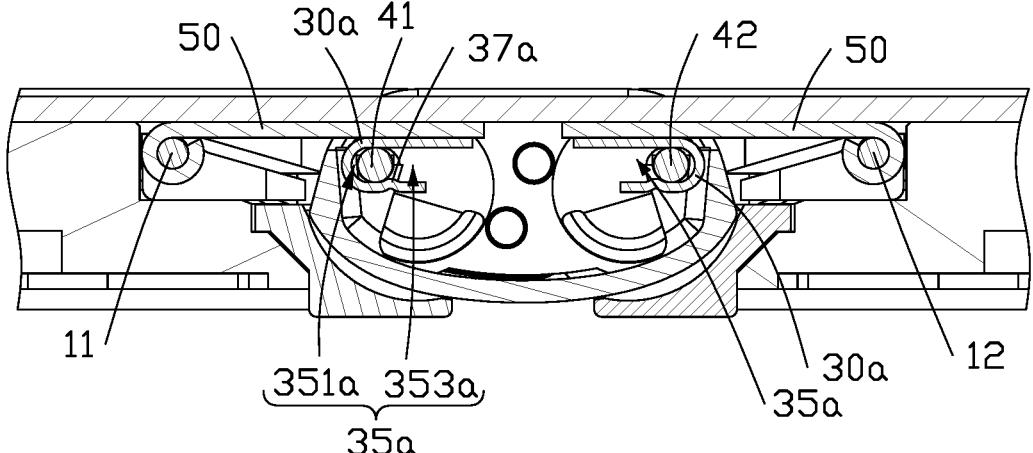
FIG. 10 is a diagrammatic view of yet another embodiment of an electronic device in an open state according to the present disclosure.
Figure 11:
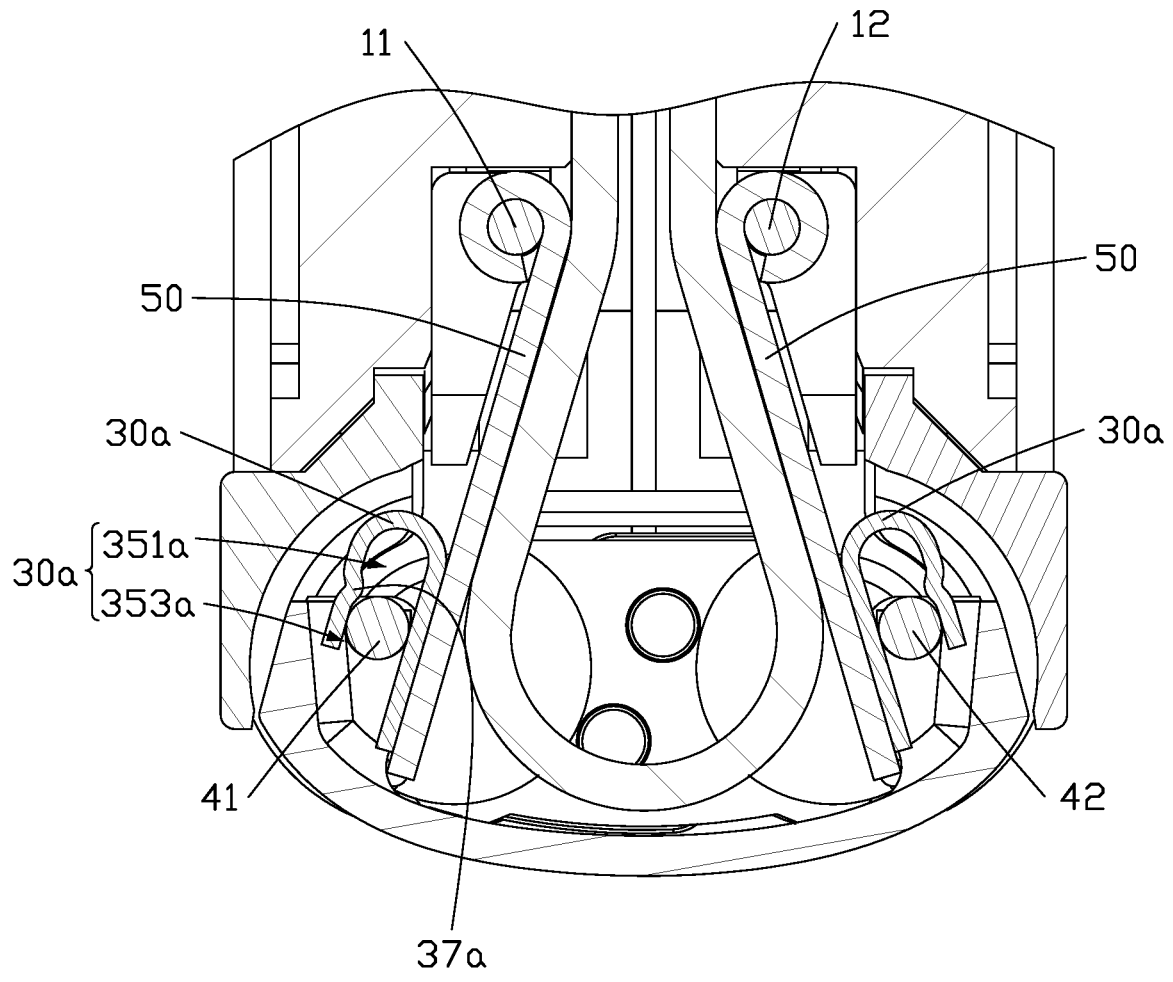
FIG. 11 is a diagrammatic view of a portion of the electronic device in a closed state.

Referring to FIGS. 10 and 11, a guiding member 30a is provided according to another embodiment of the present disclosure. At least one protruding point 37a is provided on the guiding member 30a. The protruding point 37a protrudes toward the sliding groove 35a. The protruding point 37a separates the sliding groove 35a into a first cavity 351a and a second cavity 353a that communicate with each other. Referring to FIG. 10, when the electronic device 200 is in an open state, the first guiding shaft 41 or the second guiding shaft 42 is located in the first cavity 351a. Referring to FIG. 11, when the electronic device 200 is in the closed state, the first guiding shaft 41 or the second guiding shaft 42 is located in the second cavity 353a. When the electronic device 200 is from the open state to the closed state or from the closed state to the open state, the guiding member 30a slides relative to the first guiding shaft 41 or the second guiding shaft 42, and the first guiding shaft 41 or the second guiding shaft 42 needs to pass through the protruding point 37a, the external force acting on the first body 210 and/or the second body 220 need to be increased so that the electronic device 200 has a self-locking function.

Figure 12:
FIG. 12 is a cross-sectional view taken along line XII-XII of FIG. 1.
Figure 12:
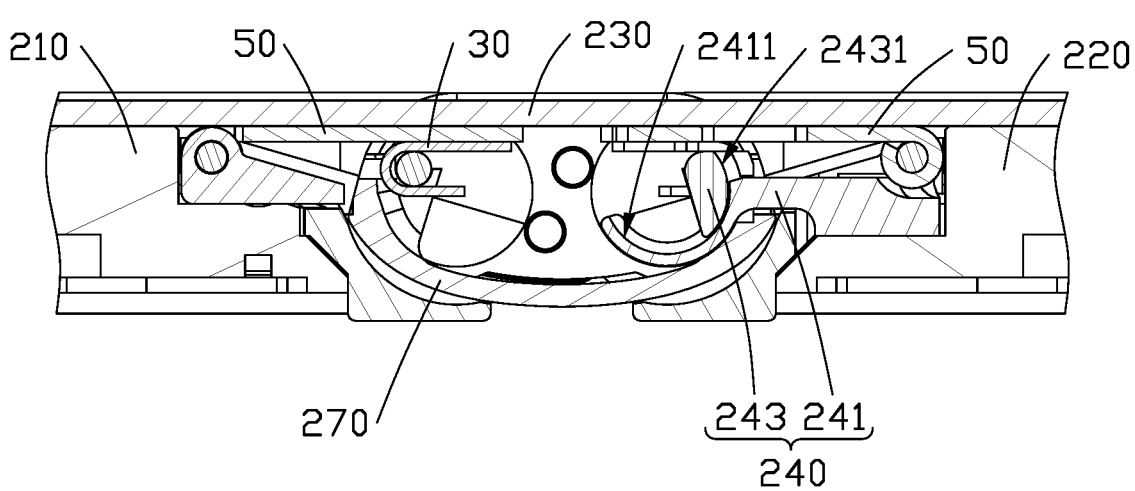

Referring to FIGS. 1 and 12, in some embodiments, the electronic device 200 may further include a reinforcing structure 240 disposed between the two hinge modules 260, and the reinforcing structure 240 is disposed on a side of the supporting plate 50 away from the flexible screen 230.

The reinforcing structure 240 includes a reinforcing block 241 and a reinforcing rail 243, and at least one reinforcing structure 240 is provided on each of the first body 210 and the second body 220. The reinforcing block 241 is fixed relative to the supporting plate 50, and the reinforcing block 241 can be fixed on the first body 210 or the second body 220 by screws (not shown). The reinforcing rail 243 is relatively fixed to the second shaft assembly 40, and the reinforcing rail 243 can be fixed on the barrel 270. An outer surface 2431 of the reinforcing rail 243 is arc-shaped, an inner surface 2411 of the reinforcing block 241 is engaged with the arc-shaped outer surface 2431, and the reinforcing block 241 can slide along the reinforcing rail 243. In the embodiment, the two hinge modules 260 of the electronic device 200 are disposed at both ends of the supporting plate 50, the distance is relatively far, and the reinforcing structure 240 can strengthen synchronization between the movement at a middle area of the supporting plate 50 and the movement at the two end areas of the support plate 50.

Figure 13:
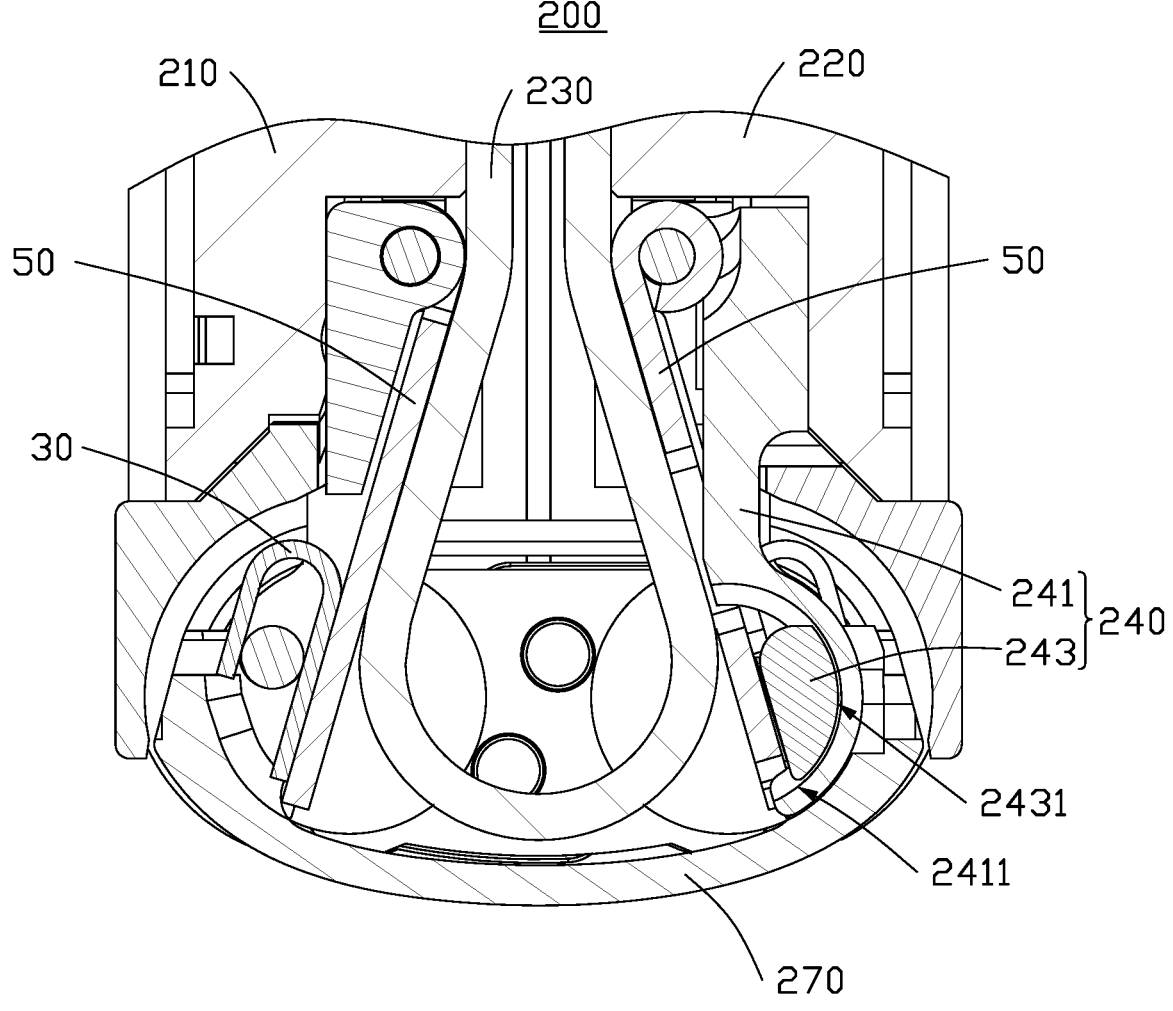
FIG. 13 is a cross-sectional view taken along line XIII-XIII of FIG. 3.

Referring to FIGS. 12 and 13, the reinforcing rail 243 does not coincide with the first rotation axis L1 and the second rotation axis L2. The rotation of the reinforcing block 241 and the movement of the supporting plates 50 can be prevented from interfering with each other during the relative rotation of the first body 210 and the second body 220.

Referring to FIG. 5, the reinforcing structure 240 is interlaced with the guiding member 30 and the second shaft assembly 40 passing through the guiding member 30. Thus, the middle area is occupied as much as possible, so that the force on both sides of the electronic device 200 is even when the electronic device 200 is folded.

In other embodiments, the opening direction of one sliding groove 35 or two sliding grooves 35 can also be exchanged. For example, openings of the sliding grooves 35 disposed on the two supporting plates 50 faces each other, so that the first guiding shaft 41 and the second guiding shaft 42 can move relative to the guiding member 30.

The hinge structure 100 provided by the embodiment of the present disclosure includes the first shaft assembly 10, the at least two guiding members 30, the second shaft assembly 40, and the two support plates 50. One end of the support plate 50 is rotatably connected to the first shaft assembly 10, and the other end of the support plate 50 is slidably connected to the second shaft assembly 40. When the first body 210 and the second body 220 are closed to each other, the two support plates 50 retracted relative to the second shaft assembly 40, thereby creating a certain space for accommodating the flexible screen 230, that is, a "water drop angle" is formed. The hinge structure 100 can realize the support function and form the "water drop angle" with a small number of elements. Thus, manufacturing and assembly costs is reduced, a small space is occupied, and the thickness and weight of the electronic device 200 is reduced.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A hinge structure configured to be disposed between a first body and a second body of an electronic device and connected to the first body and the second body, the hinge structure comprising:
   a first shaft assembly;
   at least two guiding members, wherein each of the at least two guiding members comprises a first end and a second end, the first end is bent to form a sliding groove;
   a second shaft assembly disposed in the sliding groove; and
   two supporting plates;
   wherein the first shaft assembly is configured to be disposed in the first body and the second body; the two supporting plates are configured to be connected to the first body and the second body, respectively, one end of each of the two supporting plates is sleeved on the first shaft assembly, and another end of each of the two supporting plates is fixed to the second end of a respective one of the at least two guiding members; when the first body and the second body are closed to or opened with each other, the second shaft assembly is displaced relative to the at least two guiding members; each of the at least two guiding members comprises at least one protruding point, and the at least one protruding point protrudes toward the sliding groove, and the at least one protruding point separates the sliding groove into a first cavity and a second cavity communicating with each other; when the first body and the second body are closed to each other or opened with each other, the second shaft assembly generates a displacement between the first cavity and the second cavity.

2. The hinge structure of claim 1, wherein the at least two guiding members are configured to rotate about the first shaft assembly.

3. The hinge structure of claim 1, wherein each of the two supporting plates comprises a flat portion and a winding portion connected to each other, the at least two guiding members are fixed on the flat portion, and the first shaft assembly pass through the winding portion.

4. The hinge structure of claim 3, wherein when the first body and the second body are closed to each other, a distance between the flat portions of the two supporting plates is greater than a distance between the winding portions of the two supporting plates.

5. An electronic device comprising:
   a first body;
   a second body;
   a flexible screen; and
   a hinge structure disposed between the first body and the second body connected to the first body and the second body, the hinge structure comprising:
      a first shaft assembly;
      at least two guiding members, wherein each of the at least two guiding members comprises a first end and a second end, the first end is bent to form a sliding groove;
      a second shaft assembly disposed in the sliding groove; and
      two supporting plates;
   wherein the two supporting plates are configured to be connected to the first body and the second body, respectively, one end of each of the two supporting plates is sleeved on the first shaft assembly, and another end of each of the two supporting plates is fixed to the second end of a respective one of the at least two guiding members; when the first body and the second body are closed to or opened with each other, the second shaft assembly is displaced relative to the at least two guiding members; each of the at least two guiding members comprises at least one protruding point, and the at least one protruding point protrudes toward the sliding groove, and the at least one protruding point separates the sliding groove into a first cavity and a second cavity communicating with each other; when the first body and the second body are closed to or opened with each other, the second shaft assembly generates a displacement between the first cavity and the second cavity.

6. The electronic device of claim 5, further comprising a reinforcing structure, wherein the reinforcing structure is disposed on a side of the two supporting plates away from the flexible screen.

7. The electronic device of claim 6, wherein the reinforcing structure comprises a reinforcing block and a reinforcing rail, the reinforcing block is fixed to the first body or the second body; the reinforcing block is configured to slide on the reinforcing rail; an outer surface of the reinforcing rail is arc-shaped, and an inner surface of the reinforcing block is engaged with the outer surface.

8. The electronic device of claim 7, wherein the reinforcing rail is spaced from a rotation axis of each of the two supporting plates.

9. The electronic device of claim 8, wherein each of the two supporting plates comprises a flat portion and a winding portion connected to each other, the at least two guiding members are fixed on the flat portion, and the first shaft assembly pass through the winding portion.

10. The electronic device of claim 9, wherein when the first body and the second body are closed to each other, a distance between the flat portions of the two supporting plates is greater than a distance between the winding portions of the two supporting plates.

11. The electronic device of claim 5, wherein the at least two guiding members are configured to rotate about the first shaft assembly.

* * * * *